June 12, 1951     A. T. BODLE     2,556,412
BALL BEARING SHIFTER COLLAR
Filed Oct. 15, 1948     2 Sheets-Sheet 2
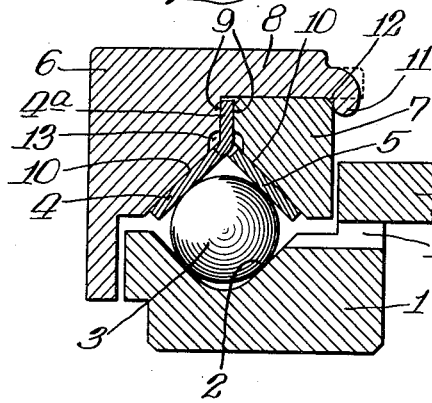
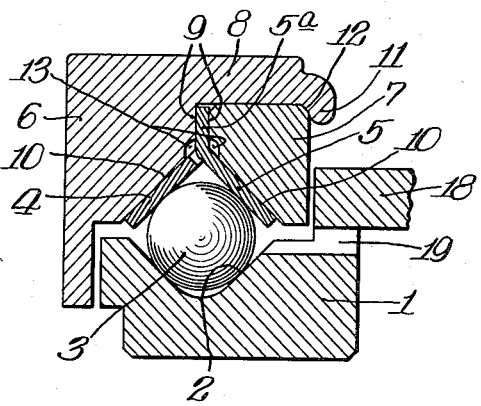
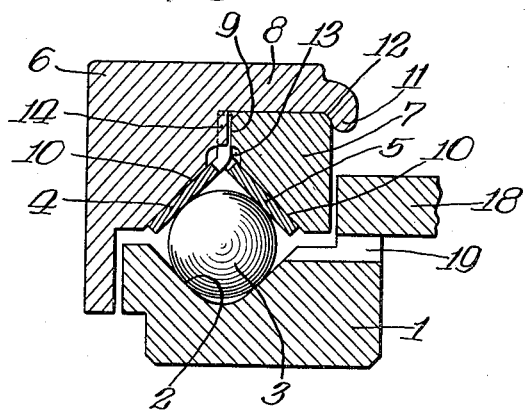
INVENTOR.
Alexander T. Bodle,
BY Osgood H. Dowell
Atty.

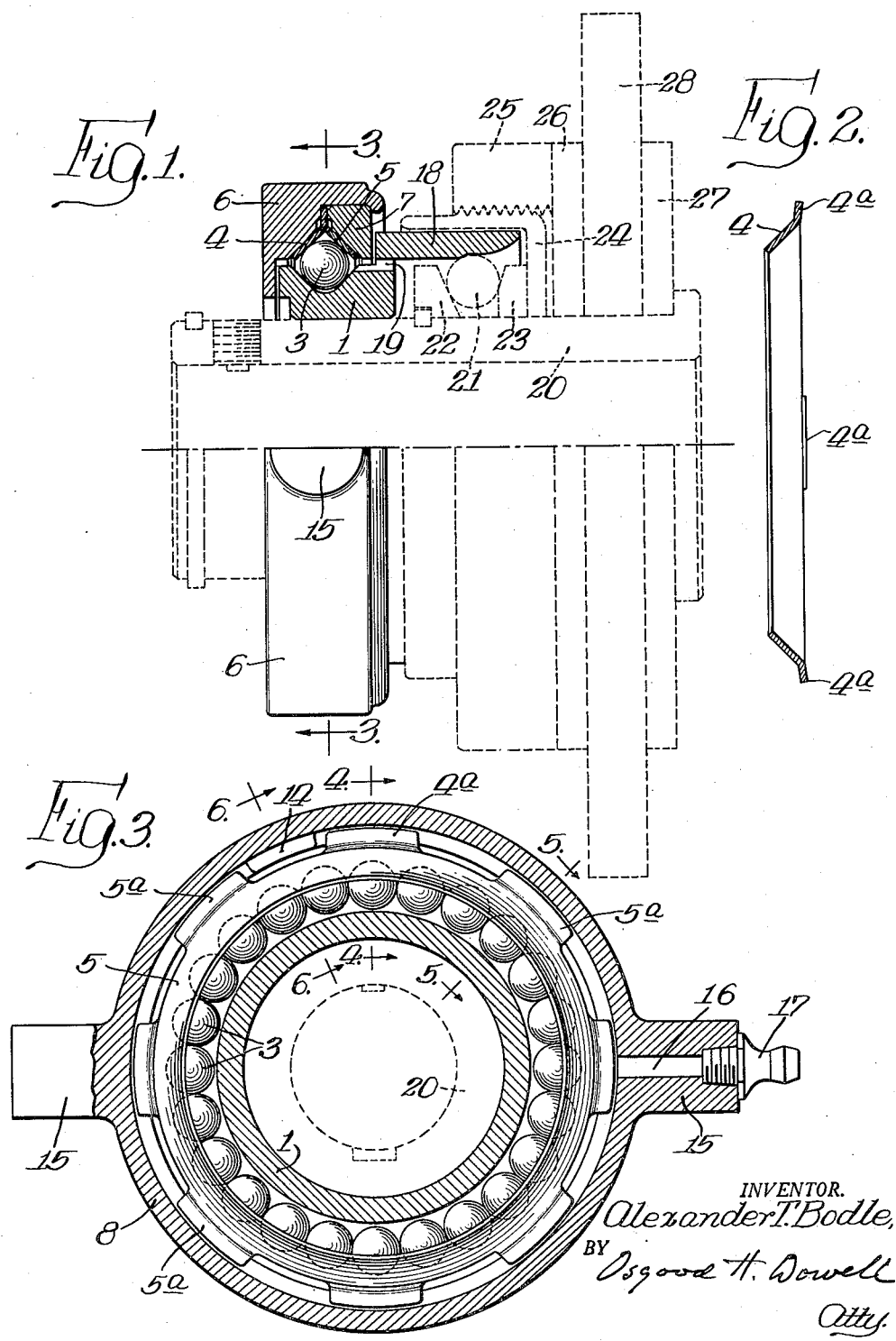

Patented June 12, 1951

2,556,412

UNITED STATES PATENT OFFICE 2,556,412

BALL-BEARING SHIFTER COLLAR

Alexander T. Bodle, Mishawaka, Ind., assignor to Dodge Manufacturing Corporation, Mishawaka, Ind., a corporation of Indiana Application October 15, 1948, Serial No. 54,807

9 Claims. (Cl. 308—235)

In a friction clutch, an axially shiftable sleeve fitted slidably and rotatably on the clutch shaft or hub is utilized for actuating means by which to force the friction clutching elements into gripping engagement. The shifter sleeve is commonly provided with a surrounding collar swiveled thereto and operable by a shifter yoke or other suitable means for shifting the collar and the sleeve therewith.

The present invention pertains to the type of clutch shifter in which the shifter collar has a ball-bearing mounting on the shifter sleeve, and aims to provide in or for such device an improved shifter collar having its ball race lined by wear rings and of a construction which is practicable and affords substantial advantages in manufacture.

An illustrative embodiment of the invention is shown in the accompanying drawings, wherein:

Fig. 1 represents half in longitudinal section and half in side elevation one type of friction clutch to which the invention may be applied, the clutch shifter being shown in full lines and the other parts of the clutch, which are old, being represented in dotted lines.

Fig. 2. is an axial section of a wear ring.

Fig. 3 is a cross-section of the clutch shifter taken on the line 3—3 of Fig. 1, looking in the direction of the arrows, and showing in elevation the wear ring which is anterior to or in front of the plane of said section.

Figs. 4, 5 and 6 are sections of the clutch shifter taken respectively on the lines 4—4, 5—5 and 6—6 of Fig. 3.

In the drawings, 1 denotes a clutch shifter sleeve formed with an external annular groove 2 engaged by an annular series of balls 3 running in an internal groove or ball-race in a surrounding shifter collar. Said collar is of composite construction, its internal groove or ball-race being formed by a pair of hardened metal wear rings 4 and 5 fitted in a pair of concentric holding rings 6 and 7.

The main holding ring 6 is interiorly rabbeted to form a tubular flange 8 of uniform bore in which the supplemental holding ring 7 is fitted and secured. These holding rings have confronting faces comprising annular flat outer surfaces 9 and conical inner surfaces 10 diverging inwardly. Said conical surfaces 10 are lined by the wear rings 4 and 5 which consist of resilient sheet-metal stampings. These wear rings are formed with tongues 4ª and 5ª extending from their outer peripheries and bent outwardly and held between the flat surfaces 10 of the holding rings. The tongues 4ª of the wear ring 4 are arranged in alternation with the tongues 5ª of the wear ring 5, or in other words the tongues of the two wear rings are in staggered relation, as shown in Fig. 3.

The associated tongues of the two wear rings are clamped or embraced by the holding rings—a condition which is to be considered fulfilled if the flat surfaces 9 are so closely adjacent as to clamp the tongues of one of the wear rings or to hold the two sets of tongues 4ª and 5ª in the same plane, or if the ring 7 is held as close or about as close to the ring 6 as the intervening tongues will permit. In assembling the structure, the ring 7 is forced axially toward the ring 6 as far as it will go and is then secured in place by swaging the end portion of the flange 8 against the back end of 7 as indicated at 11. The rear outer annular corner portion of the ring 7 may be beveled as indicated at 12 to enable the end portion of the flange 8 to be swaged thereover in a manner to make a tight neat joint.

Each of the wear rings 4 and 5 may have its tongues formed with their outwardly bent portions in approximately a common plane, so that the two sets of tongues 4ª and 5ª may be clamped by the holding rings or held in a common plane between the flat surfaces 10 without materially flexing or bending the tongues. However such a condition is neither necessary nor preferred. Preferably the wear rings are formed, as exemplified in Fig. 2, with the outwardly bent portions of the tongues slightly inclined to a plane perpendicular to the ring axis, so as to require a flexing and substantial stressing of the resilient tongues, by pressure of the flat surfaces 10 thereagainst, in order to bring them to approximately a position in a common plane. This is preferred for a tight assembly and to prevent or minimize rattling of the wear rings.

To prevent interference with the fit of the wear rings in the holding rings by reason of the bends in the tongues 4ª and 5ª, the face portions of the holding rings immediately adjacent to said bends are cut away by annular grooves 13, thus eliminating the angular corners that would exist if the flat surfaces 9 met the conical surfaces 10.

As the wear rings are resilient sheet metal stampings, they possess sufficient flexibility to accommodate such imperfections of fit as may be tolerated in manufacture.

As shown in Figs. 3 and 6, the main holding ring 6 is formed with an internal lug 14 arranged between adjacent tongues 4ª and 5ª of the two wear rings, whereby to prevent other than very limited rotative movement of the wear rings relative to the holding ring. If the wear rings should tend to rotate in the direction of shaft rotation, a tongue of one of said wear rings will abut against the lug 14 and a tongue of the other wear ring will abut against the one engaging said lug.

The main holding ring 6 is formed with diametrically opposite trunnions 15 for engagement by a shifter yoke. Grease can be introduced into the ball race of the shifter collar through a duct 16 extending through one of said trunnions. Said one of the trunnions is shown equipped with a fitting 17 through which grease can be introduced by a grease gun. Communication between the grease duct 16 and ball race is through the gap between the outer edges of the wear rings 4 and 5, which gap is best shown in Fig. 6.

The construction described is highly practicable and advantageous for manufacture. It permits utilization of unhardened metal for the main portion of the shifter collar. The holding rings 6 and 7 may be of iron or other suitable metal or material. Preferably the main holding ring 6 is a die casting of zinc or zinc alloy, while the auxiliary holding ring is of mild steel or cast iron. The wear rings 4 and 5 are preferably stamped from surface hardened sheet steel or alloy steel.

In assembling the shifter, the main holding ring 6 having the wear ring 4 fitted therein is supported face side up on a vertically disposed axis and in proper relation to the sleeve 1. The balls 3 are then put in place and covered by the wear ring 5. The auxiliary holding ring 7 is then inserted in the flange 8 and forced axially toward the ring 6 as far as is permitted by the tongues 4ª and 5ª, whereupon the end portion of the flange 8, originally formed as indicated in dotted lines in Fig. 4, is swaged against the ring 7.

As will be understood by those familiar with the art, the shifter sleeve 1 will be formed or provided with suitable means for coaction with devices by which to apply axial thrust or pressure to the axially movable presser plate of a clutch. The shifter selected for illustration is intended for application to a clutch of the type in which pressure is so applied by forcibly contracting an annular series of balls which engage outwardly diverging faces of a pair of rings, one being an abutment ring and the other an axially movable thrust-transmitting ring. The shifter sleeve 1 is therefore formed with a tubular extension 18 having an internal cam surface for coaction with the annular series of balls to be so contracted. The hole 19 is for passage of grease from the ball race of the shifter collar to the interior of the sleeve extension 18.

In Fig. 1, a clutch of the type referred to is shown, the parts thereof other than the shifter being indicated in dotted lines. The shifter sleeve 1 is slidably and rotatably fitted on the clutch hub 20. An annular series of balls 21 engage the outwardly divergent faces of a pair of rings 22 and 23, the ring 22 being an abutment ring and the ring 23 being axially displaceable. The balls 21 and rings 22 and 23 are contained in a cup-shaped thrust-transmitting ring 24 on which is screwed an adjusting nut 25 abutting the axially movable presser plate 26 which cooperates with the abutment plate 27 for clamping an interposed friction disc 28. When the clutch shifter is shifted to the position shown, the annular series of balls 21 is contracted, whereby the balls functioning as wedges force the ring 23 in a direction away from the ring 22, the thrust thus exerted being transmitted through the cup-shaped ring 24 and adjusting nut 25 to the presser plate 26. By moving the clutch shifter to the left, the extension 18 can be withdrawn so as to allow release of the clutch and forcing of the balls 21 outwardly against the interior of the cup-shaped ring 24.

As the type of clutch described is old, it needs no further description. Clutches of said type are illustrated in the Firth Patent 2,367,390 and Fast Patent 2,397,414.

I claim:

1. In a clutch shifter comprising a shifter sleeve and a surrounding shifter collar and an interposed annular series of balls running in confronting races in said sleeve and collar, the said collar comprising a pair of concentric rings having confronting inwardly diverging conical surfaces and a pair of conical sheet-metal wear rings lining said surfaces and forming the outer race for said balls, said wear rings having tongues extending from their outer edges and bent outwardly and clamped between said first mentioned rings.

2. In a clutch shifter comprising a shifter sleeve and a surrounding shifter collar and an interposed annular series of balls running in confronting races in said sleeve and collar, the said collar comprising a pair of concentric rings one of which is interiorly rabbeted and has the other fitted and secured therein, said rings having confronting faces comprising annular flat outer surfaces and inwardly diverging conical inner surfaces, and conical sheet-metal wear rings lining said conical surfaces and forming the outer race for said balls, said wear rings having radially projecting tongues clamped between said flat surfaces.

3. In a clutch shifter comprising a shifter sleeve and a surrounding shifter collar and an interposed annular series of balls running in confronting races in said sleeve and collar, the said collar comprising a pair of concentric rings one of which is interiorly rabbeted and has the other fitted and secured therein, said rings having confronting faces comprising annular flat outer surfaces and inwardly diverging conical inner surfaces, and conical sheet-metal wear rings lining said conical surfaces and forming the outer race for said balls, said wear rings having radially projecting tongues clamped between said flat surfaces, the tongues of the two wear rings being in staggered relation.

4. In a clutch shifter comprising a shifter sleeve and a surrounding shifter collar and an interposed annular series of balls running in confronting races in said sleeve and collar, the said collar comprising a pair of concentric rings one of which is interiorly rabbeted and has the other fitted and secured therein, said rings having confronting faces comprising annular flat outer surfaces and inwardly diverging conical inner surfaces, and conical sheet-metal wear rings lining said conical surfaces and forming the outer race for said balls, said wear rings having radially projecting tongues clamped between said flat surfaces, the tongues of the two wear rings being in staggered relation, one of said first mentioned rings having a lug arranged between adjacent tongues.

5. In a clutch shifter comprising a shifter sleeve and a surrounding shifter collar and an interposed annular series of balls running in confronting races in said sleeve and collar, the said collar comprising a pair of concentric rings one of which is interiorly rabbeted and has the other fitted and secured therein, said rings having confronting faces comprising annular flat outer surfaces and inwardly diverging conical inner surfaces, and conical sheet-metal wear rings lining said conical surfaces and forming the outer race for said balls, said wear rings having radially projecting tongues clamped between said flat surfaces, said one of the first mentioned rings having diametrically opposite trunnions for engagement by a shifter yoke and a grease duct extending through one of said trunnions and communicating with said race through the gap between the outer edges of said wear rings.

6. A shifter collar comprising a main ring having a concentric tubular flange, an auxiliary ring fitted in said flange and adapted to be forced axially toward the main ring and secured in place by swaging the end portion of said flange against the rear end of said auxiliary ring, said rings having confronting faces comprising annular flat outer surfaces and inwardly diverging conical inner surfaces, and conical sheet-metal wear rings lining said conical surfaces and having radially projecting tongues clamped between said flat surfaces, said wear rings forming a race for an annular series of balls.

7. A shifter collar comprising a main ring having a concentric tubular flange, an auxiliary ring fitted in said flange and adapted to be forced axially toward the main ring and secured in place by swaging the end portion of said flange against the rear end of said auxiliary ring, said rings having confronting faces comprising annular flat outer surfaces and inwardly diverging conical inner surfaces, and conical sheet-metal wear rings lining said conical surfaces and having radially projecting tongues clamped between said flat surfaces, said wear rings forming a race for an annular series of balls, the tongues of the two wear rings being in staggered relation.

8. A shifter collar comprising a main ring having a concentric tubular flange, an auxiliary ring fitted in said flange and adapted to be forced axially toward the main ring and secured in place by swaging the end portion of said flange against the rear end of said auxiliary ring, said rings having confronting faces comprising annular flat outer surfaces and inwardly diverging conical inner surfaces, and conical sheet-metal wear rings lining said conical surfaces and having radially projecting tongues clamped between said flat surfaces, said wear rings forming a race for an annular series of balls, the tongues of the two wear rings being in staggered relation, said main ring having an internal lug and said wear rings being arranged so that said lug is between adjacent tongues.

9. A shifter collar comprising a main ring having a concentric tubular flange, an auxiliary ring fitted in said flange and adapted to be forced axially toward the main ring and secured in place by swaging the end portion of said flange against the rear end of said auxiliary ring, said rings having confronting faces comprising annular flat outer surfaces and inwardly diverging conical inner surfaces, and conical sheet-metal wear rings lining said conical surfaces and having radially projecting tongues clamped between said flat surfaces, said wear rings forming a race for an annular series of balls, said main ring having diametrically opposite trunnions for engagement by a shifter yoke and a grease duct extending through one of said trunnions and communicating with said race through the gap between the outer edges of said wear rings.

ALEXANDER T. BODLE.

REFERENCES CITED

The following references are of record in the file of this patent:

UNITED STATES PATENTS

| Number | Name | Date |
| --- | --- | --- |
| 637,204 | Heath | Nov. 14, 1899 |
| 1,763,840 | Watling | June 17, 1930 |
| 2,296,652 | Ray | Sept. 22, 1942 |
| 2,380,971 | Knox | Aug. 7, 1945 |